US008195231B2

(12) United States Patent
Ring

(10) Patent No.: US 8,195,231 B2
(45) Date of Patent: Jun. 5, 2012

(54) SYSTEM FOR COLLECTION AND DISTRIBUTION OF MACHINE DATA VIA A CELLULAR DEVICE

(75) Inventor: Paul Alan Ring, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 669 days.

(21) Appl. No.: 11/981,021

(22) Filed: Oct. 31, 2007

(65) Prior Publication Data

US 2009/0111520 A1 Apr. 30, 2009

(51) Int. Cl.
*H04B 1/38* (2006.01)
*H04W 24/00* (2009.01)
*G01L 25/00* (2006.01)

(52) U.S. Cl. ......... 455/557; 455/423; 702/113; 702/122

(58) Field of Classification Search .................. 455/557, 455/414.1, 414.2, 423; 73/114.01; 701/29; 370/241
See application file for complete search history.

(56) References Cited

U.S. PATENT DOCUMENTS 6,611,740 B2 * 8/2003 Lowrey et al. .................. 701/29
6,825,758 B1 * 11/2004 Laitsaari ....................... 340/442
7,181,370 B2 2/2007 Furem et al.
7,225,064 B2 * 5/2007 Fudali et al. .................... 701/29
7,269,183 B2 * 9/2007 Morris .......................... 370/466
7,627,406 B2 * 12/2009 Wang et al. ..................... 701/33
7,734,287 B2 * 6/2010 Ying ............................ 455/423
2003/0095038 A1 5/2003 Dix
2006/0122742 A1 6/2006 Hasegawa et al.
2007/0156318 A1 7/2007 Anderson et al.
2007/0168091 A1 7/2007 Huang et al.

FOREIGN PATENT DOCUMENTS

EP 1818873 A 8/2007
WO 0072463 A 11/2000
WO WO2006/054971 A2 * 5/2006
WO 2006127534 A 11/2006

* cited by examiner

*Primary Examiner* — Nick Corsaro
*Assistant Examiner* — Michael S Bush
(74) *Attorney, Agent, or Firm* — Finnegan, Henderson, Farabow, Garrett & Dunner LLP

(57) ABSTRACT

A data collection and distribution system associated with a machine comprises an electronic control module located on a machine. The electronic control module is configured to collect operation data associated with the machine. The system also comprises a personal area network (PAN) control module communicatively coupled to the electronic control module. The PAN control module is configured to detect a PAN-compatible cellular communication device proximate the PAN control module. The PAN control module is also configured to transmit the operation data to the PAN-compatible cellular communication device using a PAN connection between the PAN control module and the PAN-compatible cellular device, wherein the PAN-compatible cellular communication device is configured to transmit the operation data to a condition monitoring system via a cellular network.

20 Claims, 3 Drawing Sheets

SYSTEM FOR COLLECTION AND DISTRIBUTION OF MACHINE DATA VIA A CELLULAR DEVICE

TECHNICAL FIELD

The present disclosure relates generally to condition monitoring and telemetry systems for on-highway and off-highway machines and, more particularly, to systems and methods for collection and distribution of machine data via a cellular device.

BACKGROUND

Remote telemetry and health monitoring systems are commonly used in a variety of industries to monitor the health, status, and/or productivity of remote assets. For example, many automobiles, transportation vehicles, and other types of machines are equipped with on-board data telemetry equipment adapted to monitor the health and status of components and subsystems of the machine. An on-board data collection device may collect the monitored data, analyze the data to determine whether the machine is operating appropriately, and generate visual or audible alarms notifying the operator if the machine is not operating appropriately. In order to perform more complex analysis (e.g., wear analysis, failure prediction, etc.) the data may be periodically transferred from the machine to a computer system or diagnostic tool. In some cases, machines may be equipped with customized satellite communication modules that periodically transmit data from the remote machine to a centralized data collection server via a subscriber-based satellite communication network.

Although satellite communication equipment and manual data transfer techniques provide solutions for offloading data from the machine for diagnostic analysis, they may have significant drawbacks. For example, because satellite communication equipment typically includes high-power, high frequency electronics, satellite communication equipment can be expensive. Moreover, operability of satellite communication networks is often impaired during inclement weather, such as during a thundershower or snowstorm.

While manual data transfer techniques may be less susceptible to inclement weather than satellite communication techniques, they may not be well-suited for project environments that require continuous monitoring and analysis of machine data. For example, because manual data collection techniques require physical offloading of the machine data onto a storage medium and uploading of the data from the storage medium to a database or diagnostic tool, such manual techniques may be impractical for machines operating in extremely remote or hazardous environments. Thus, in order to reliably access and collect machine data in a centralized server, an inexpensive and cost-effective data collection solution may be required.

One method for transferring information to and from a vehicle system is described in U.S. Patent Publication No. 2007/0168091 ("the '091 publication") to Huang et al. The '091 publication described a multimedia adapter for a vehicle that may be electronically connected to a multimedia device or system (e.g., MP3 player, etc.) The multimedia adapter may include an ECU and a Bluetooth adapter for connection with a wireless communication device, such as a cellular telephone. The ECU of the multimedia adapter may be configured to receive audible voice commands from a vehicle operator and convert the voice commands to analog signals for controlling one or more of the multimedia devices. According to one exemplary embodiment, the ECU of the multimedia adapter may be configured to detect an incoming call to the cellular telephone and automatically reduce the volume of the multimedia device without requiring the operator to manually adjust the volume.

Although the system of the '091 publication is configured to transmit data between an adapter module and external system (cellular telephone), it may be limited in certain situations. For example, the system of the '091 publication is not configured to transmit vehicle information to an off-board diagnostic computer system via the cellular telephone device. As a result, the device of the '091 publication may not facilitate remote monitoring of the vehicle or any of its constituent components or systems by an external diagnostic device.

Furthermore, the data transfer capabilities of the system of the '091 publication may be limited to certain relatively remedial functions, such as voice recognition, incoming call detection, and volume control. Such limited functionality may not be conducive to transferring and monitoring large amounts of vehicle health, status, and/or productivity information. In fact, the multimedia adapter described in the '091 publication is limited to multimedia device control functions and does not collect or monitor vehicle health, status, and/or productivity information.

The presently disclosed systems and methods for collection and distribution of machine data via a cellular telephone are directed toward overcoming one or more of the problems set forth above.

SUMMARY

In accordance with one aspect, the present disclosure is directed toward a method for collection and distribution of machine data via a cellular communication device. The method may comprise collecting, by an electronic control module of a machine, operation data associated with the machine. A personal area network (PAN) control module communicatively coupled to the electronic control module may detect a PAN-compatible cellular communication device proximate the PAN control module. The method may also include transmitting the operation data to the PAN-compatible cellular communication device, wherein the PAN-compatible cellular communication device is configured to transmit the operation data to a condition monitoring system via a cellular network.

According to another aspect, the present disclosure is directed toward a system for collection and distribution of machine data via a cellular communication device. The system may include an electronic control module located on a machine and a personal area network (PAN) control module communicatively coupled to the electronic control module. The electronic control module may be configured to collect operation data associated with the machine. The PAN control module may be configured to detect a PAN-compatible cellular communication device proximate the PAN control module and transmit the operation data to the PAN-compatible cellular communication device, wherein the PAN-compatible cellular communication device is configured to transmit the operation data to a condition monitoring system via a cellular network.

In accordance with another aspect, the present disclosure is directed toward a project environment comprising at least one monitoring device configured to monitor at least one operational aspect associated with a machine operating in the project environment. The project environment may also include an electronic control module communicatively coupled to the at least one monitoring device. The electronic control module may be configured to collect data indicative of the at least one operational aspect from the at least one monitoring device. The project environment may further include a PAN control module communicatively coupled to the electronic control module. The PAN control module may be configured to detect a PAN-compatible cellular communication device proximate the PAN control module and transmit the data indicative of the at least one operational aspect to the PAN-compatible cellular communication device. The PAN-compatible cellular communication device may be configured to transmit the data indicative of the at least one operation aspect to a condition monitoring system via a cellular network.

DETAILED DESCRIPTION

Figure 1:
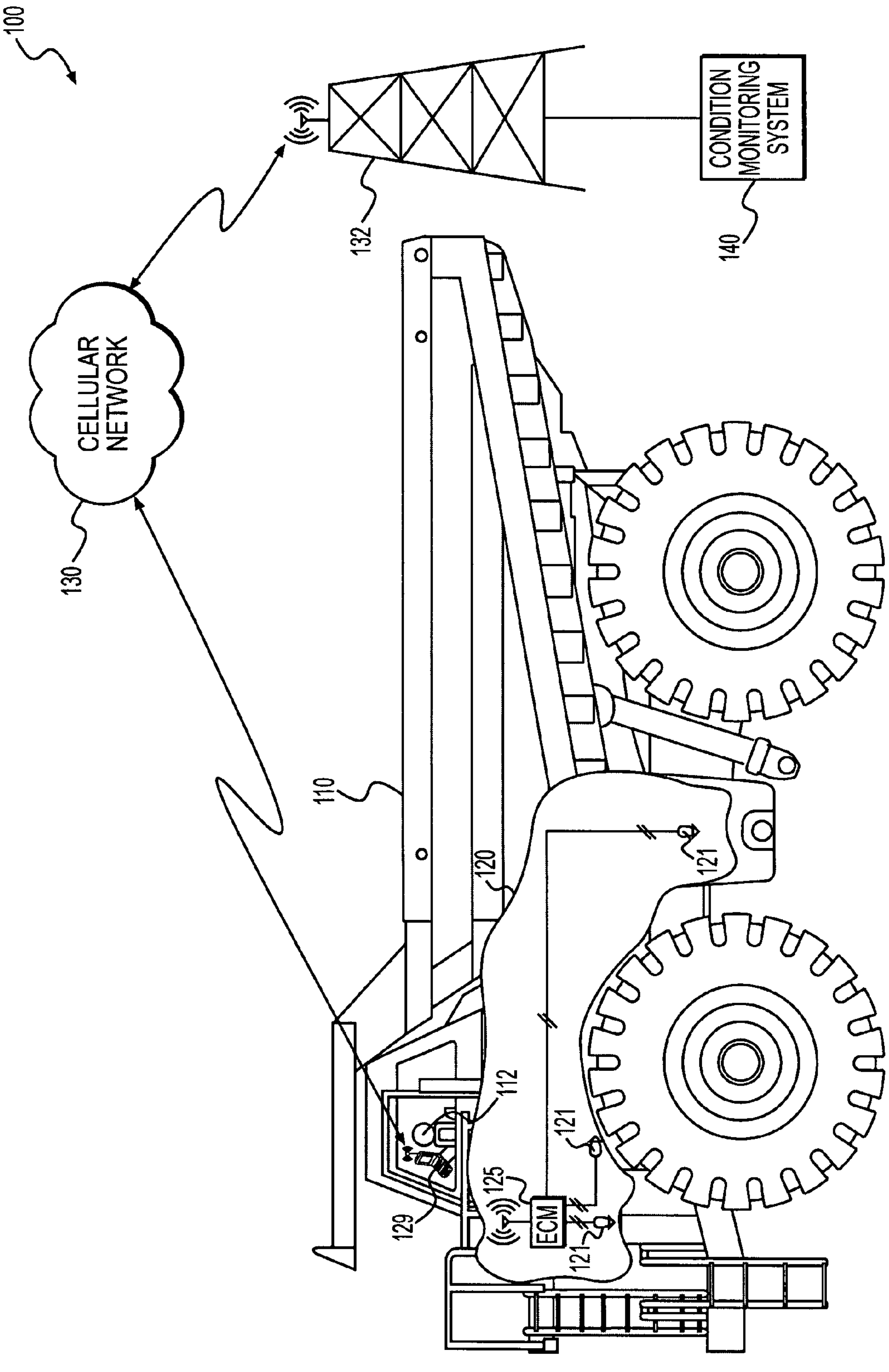
FIG. 1 illustrates an exemplary project environment consistent with the disclosed embodiments.

FIG. 1 illustrates an exemplary project environment 100 consistent with certain disclosed embodiments. Project environment 100 may include one or more components that perform individual tasks that contribute to a machine environment task, such as mining, construction, transportation, agriculture, manufacturing, or any other type of task associated with other types of industries. For example, project environment 100 may include one or more machines 110 coupled to a condition monitoring system 140 via one or more cellular networks 130. The project environment 100 may be configured to monitor, collect, control, and/or filter information associated with an operation of one or more machines 110 and distribute the information to one or more back-end systems, such as condition monitoring system 140. It is contemplated that additional and/or different components than those listed above may be included in project environment 100. For example, project environment 100 may include one or more data subscribers communicatively coupled to condition monitoring system 140 and configured to receive machine operation data from the condition monitoring system 140. Data subscribers may include computer systems associated with a person or entity associated with project environment such as, for example, a machine owner, a project manager, a repair technician, or any other person or entity that may be associated with project environment 100 or one or more machines 110 associated therewith.

Machine 110 may be a fixed or mobile machine configured to perform an operation associated with project environment 100. Thus, machine, as the term is used herein, refers to a fixed or mobile machine that performs some type of operation associated with a particular industry, such as mining, construction, farming, etc. and operates between or within project environments (e.g., construction site, mine site, power plants, etc.) Furthermore, machine 110 may be used to refer to any remote asset operating within or associated with project environment 100. A non-limiting example of a fixed machine includes an engine system operating in a plant, a material conveyer, or off-shore environment (e.g., off-shore drilling platform). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment. A machine may be driven by a combustion engine or an electric motor. The types of machines listed above are exemplary and not intended to be limiting. It is contemplated that project environment 100 may implement any type of machine. Accordingly, although FIG. 1 illustrates machine 110 as a mobile haulage machine, machine 110 may be any type of machine operable to perform a particular function within project environment 100. Machine 110 may be operated by machine operator 112.

Machine 110 may include on-board data collection and communication equipment to monitor, collect, and/or distribute information associated with one or more components of machine 110. According to one embodiment, on-board data collection and communication equipment may include a system 120 for collection and distribution of machine data via a cellular communication device. It is contemplated that machine 110 may include additional on-board data collection and communication equipment. For example, machine 110 may include data monitoring equipment (e.g., sensors, control modules, data collectors, etc.) for monitoring health, productivity, status, and/or performance associated with machine 110.

System 120 may include one or more components configured to monitor operation data associated with machine 110, package the monitored operation data for transmission to an off-board system, identify one or more cellular communication devices 129 located proximate system 120, and transmit the operation data to the one or more cellular communication devices 129. System 120 may include, among other things, one or more data monitoring devices 121 for collecting machine operation data and an electronic control module (ECM) 125 or other data collection device for receiving operation data from the one or more monitoring devices 121. System 120 may also include one or more cellular communication devices 129 located proximate system 120.

Figure 2:
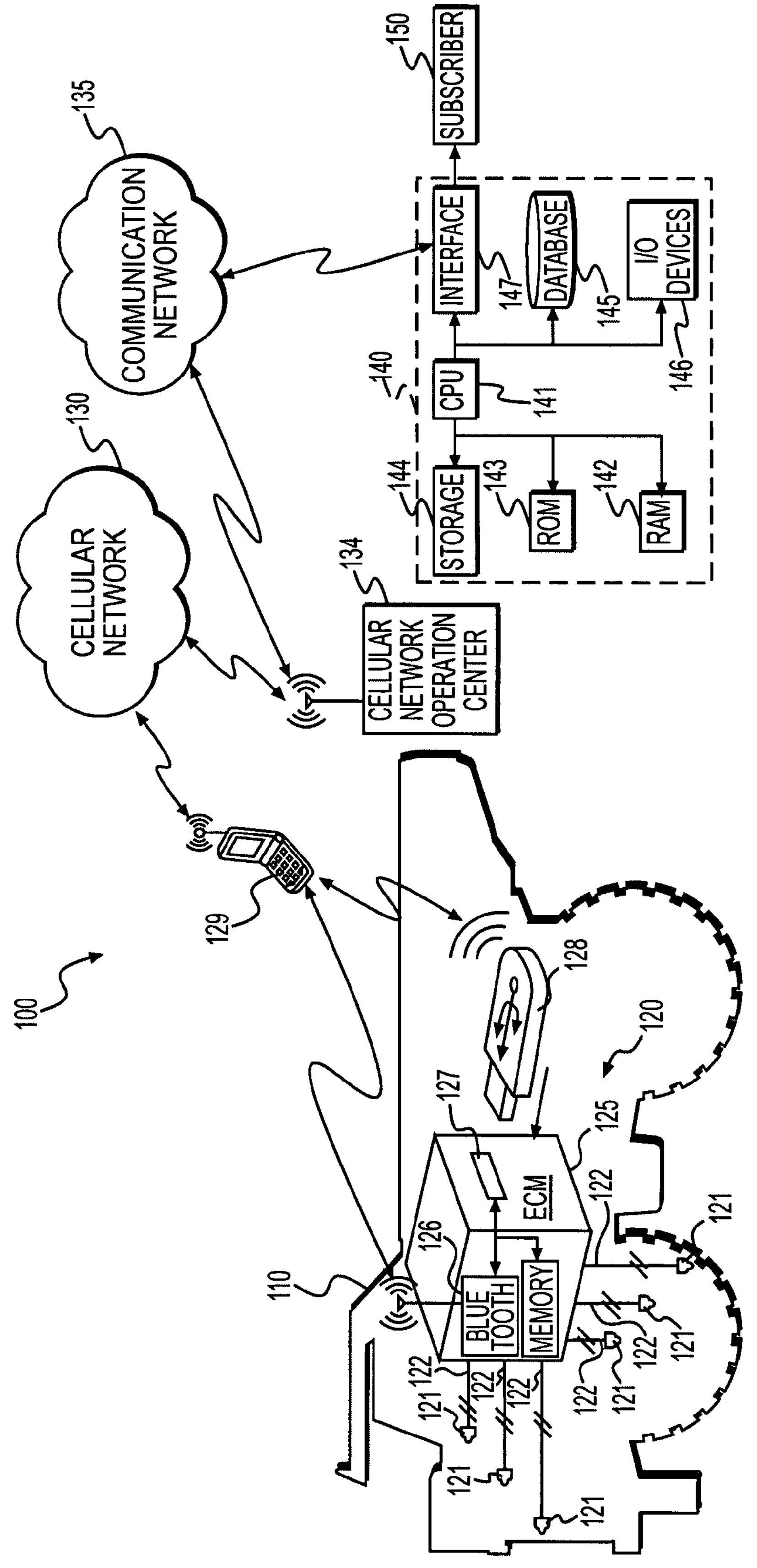
FIG. 2 provides a schematic illustrating certain exemplary components of the project environment of FIG. 1.

As illustrated in the schematic diagram of FIG. 2, project environment 100 may include a plurality of components and subsystems that cooperate to collect machine operation data and transmit the data to one or more back-end systems using personal area network (PAN) communication capabilities associated with a cellular communication device 129. Personal area network, as the term is used herein, refers to any close range (e.g., 1 m, 10 m, 100 m, etc.) wireless communication protocol that enables secure communications between or among one or more PAN-approved and compatible devices. Personal area networks may include, for example, Bluetooth devices or other short range wireless communication devices.

As shown in FIG. 2, machine 110 may include, among other things, one or more monitoring devices 121 (e.g., sensors or other data collectors); one or more ECMs 125 coupled to monitoring devices 121 via communication lines 122; and/or any other component that may be used for monitoring, collecting, and communicating information associated with the operation of machine 110. Machine 110 may also be configured to exchange information with off-board systems, such as a condition monitoring system 140, via a cellular communication device 129 (e.g., a cellular telephone). The components described above are exemplary and not intended to be limiting. Accordingly, the disclosed embodiments contemplate machine 110 including additional and/or different components than those listed above.

Monitoring devices 121 may include any device for collecting operation data associated with one or more machines 110. For example, monitoring devices 121 may include one or more sensors for measuring an operational parameter such as engine and/or machine speed and/or location; fluid pressure, flow rate, temperature, contamination level, and or viscosity of a fluid; electric current and/or voltage levels; fluid (i.e., fuel, oil, etc.) consumption rates; loading levels (i.e., payload value, percent of maximum payload limit, payload history, payload distribution, etc.); transmission output ratio, slip, etc.; haul grade and traction data; drive axle torque; intervals between scheduled or performed maintenance and/or repair operations; and any other operational parameter of machine 110.

ECM 125 may be configured to receive, collect, package, and/or distribute data collected by monitoring devices 121. Operation data, as the term is used herein, refers to any type of data indicative of at least one operational aspect associated with one or more machines 110 or any of its constituent components or subsystems. Non-limiting examples of operation data may include, for example, health information such as fuel level, oil pressure, engine temperate, coolant flow rate, coolant temperature, tire pressure, or any other data indicative of the health of one or more components or subsystems of machine 110. Alternatively and/or additionally, operation data may include status information such as engine power status (e.g., engine running, idle, off), engine hours, engine speed, machine speed, location, or any other data indicative of a status of machine 110. Optionally, operation data may also include certain productivity information such as, task progress information, load vs. capacity ratio, shift duration, haul statistics (weight, payload, etc.), fuel efficiency, or any other data indicative of a productivity of machine 110. Alternatively and/or additionally, operation data may include control signals for controlling one or more aspects or components of machine 110. ECM 125 may receive/collect operational information associated with an operation of machine 110 from one or more monitoring devices 121 during the execution of an assigned task.

ECM 125 may include one or more components for distributing the received operation data to one or more external devices, such as condition monitoring system 140 and/or cellular communication device 129. For example, ECM 125 may include an integrated PAN control module 126 configured to upload operation data to one or more PAN-compatible devices via a PAN connection. Alternatively or additionally, ECM 125 may include a satellite communication module (not shown) configured to distribute operation data via a satellite communication network when a PAN connection with cellular communication device 129 is unavailable.

According to one embodiment, ECM 125 may include a data port 127 such as, for example, a serial data port or USB port, a parallel data port, an optical communication port, and/or any other type of data port. Data port 127 may be communicatively coupled to an internal memory device (not shown) and may provide an interface that allows users to access and download data stored in ECM 125 and/or storage devices associated therewith. For example, data port 127 may embody a USB or FireWire port that may be communicatively coupled with a flash memory drive. Accordingly, users may download data stored in memory of ECM 125 onto a portable USB flash memory drive and manually transfer the data to a back-end diagnostic system, such as condition monitoring system 140.

According to another example, data port 127 may include a USB port that may interface with a wireless communication dongle or other type of USB device adapted to configure USB port 127 as a wireless data communication port. As such, a PAN communication dongle 128 may be connected to ECM 125 via data port 127. Accordingly, ECMs 125 having a USB port may be retrofitted or upgraded to support PAN communications. Thus, older-model ECMs that may not be equipped with an integrated PAN communication device (e.g., integrated PAN control module 126) may be upgraded to support PAN communications without removal or replacement of the ECM.

It is contemplated that additional types of communication dongles and/or communication devices may be supported by ECM 125 to provide redundant communication systems. For example, ECM 125 may include multiple data ports 127 and may support multiple communication formats. According to one exemplary embodiment, a PAN USB dongle may be inserted into a first data port, thereby configuring ECM to support PAN communications with other PAN-compatible devices. Additionally or optionally, a WLAN USB dongle may be inserted into a second data port, thereby configuring ECM to support communications with one or more wireless internet devices that may be associated with project environment 100.

PAN control module 126 and PAN communication dongle 128 may each embody a device that is configured to identify, interface with, and support communications with one or more other PAN compatible devices, such as a PAN-compatible cellular telephone. Accordingly, PAN control module 126 and PAN communication dongle 128 (when coupled to data port 127) may be adapted to interface with a communication queue associated with ECM 125 and format messages for transmission via a PAN communication channel.

ECM 125 may be configured to transmit collected operation data to an authorized cellular communication device 129. Cellular communication device 129 may include any PAN-compatible cellular communication device such as, for example, a cellular telephone that supports PAN communications, a PAN-enabled diagnostic tool, a personal digital assistant (PDA) that supports PAN communications, a portable notebook computer with PAN-enabled technology, or any other type of PAN communication device. According to one embodiment, cellular communication device 129 may include a PAN-compatible wireless cellular telephone associated with machine operator 112 that includes customized software adapted to detect, identify, authenticate, and communicate with ECM 125. Cellular communication device 129 may include any conventional PAN-compatible cellular telephone device such as, for example, GSM, CDMA, or TDMA formatted cellular telephones.

Cellular communication device 129 may be configured to upload data received from ECM 125 to a centralized server (e.g., condition monitoring system 140) via a cellular network 130. Cellular network 130 may include one or more devices and subsystems adapted to support a cellular communication network such as, for example, one or more cellular communication towers and/or antennae 132. Cellular network 130 may also include conventional wired or wireless networking components (e.g., wireless or wireline switches, hubs, multiplexers, demultiplexers, etc.) configured to support a cellular communication network. According to one embodiment, cellular network 130 may include one or more cellular network operations centers 134 that integrate wireless electronic components, which facilitate voice and data communication with cellular communication devices 129, with wire-based conventional networks (e.g., the Internet, land-based telephony communication networks, voice and video data networks, etc.)

Communication network 135 may embody any network that provides two-way communication between and/or among one or more facilities, computer systems, and/or servers such as, for example, between a cellular network operations center 134 and an off-board system (e.g., condition monitoring system 140). For example, communication network 135 may, when used in conjunction with a cellular network 130 and one or more cellular communication devices 129, communicatively couple machines 110 to condition monitoring system 140 across a cellular communication system for communicating data with one or more geographically dispersed assets (e.g., PAN, microwave, point-to-point wireless, point-to-multipoint wireless, multipoint-to-multipoint wireless.) It is contemplated that communication network 135 may include or embody any suitable wireless and/or wire-line networks such as, for example, Ethernet, fiber optic, waveguide, or any other type of wired communication network. It is also contemplated that communication network 135 may support additional communication media or communication methods such as smartcard technology, manual data transport methods (sneakernet), or any suitable means for transporting data between machine 110 and off-board systems.

Communication network 135 may also include any necessary infrastructure to support message routing and network operations. For example, communication network 135 may include various hardware and software support systems and equipment that facilitates operations of one or more communication services.

Condition monitoring system 140 may be configured to receive, store, analyze, and record operation data associated with system 120 of machine 110. For example, condition monitoring system 140 may detect one or more machines 110 associated with project environment 100. Condition monitoring system 140 may transmit a data request to ECM 125 associated with machines 110. Condition monitoring system 140 may receive operation data from ECM 125 in response to the request. Alternatively or additionally, condition monitoring system 140 may be configured to automatically receive operation data from ECM 125. For example, ECM 125 may be configured to automatically locate cellular communication device 129, establish a PAN communication channel, and transmit operation data to cellular communication device 129 via the PAN communication channel. Cellular communication device 129 may subsequently upload the operation data to condition monitoring system 140 via cellular network 130.

Condition monitoring system 140 may be any computing system configured to receive, transmit, analyze, and distribute operation data collected by system 120. As explained, condition monitoring system 140 may be communicatively coupled to one or more machines 110 via cellular communication device 129. According to one embodiment, condition monitoring system 140 may embody a centralized server and/or database adapted to collect and disseminate operation data collected by monitoring devices 121 associated with machine 110. Once collected, condition monitoring system 140 may categorize and/or filter the data according to data type, priority, chronology of receipt, etc.

Condition monitoring system 140 may include any type of processor-based system on which processes and methods consistent with the disclosed embodiments may be implemented. For example, as illustrated in FIG. 2, condition monitoring system 140 may include one or more hardware and/or software components configured to execute software programs, such as software for analyzing machine operation data and diagnosing problems associated with the machine, based on the analysis. For example, condition monitoring system 140 may include one or more hardware components such as, for example, a central processing unit (CPU) 141 or suitable processor, a random access memory (RAM) module 142, a read-only memory (ROM) module 143, a storage system 144, a database 145, one or more input/output (I/O) devices 146, and an interface 147. Alternatively and/or additionally, condition monitoring system 140 may include one or more software components such as, for example, a computer-readable medium including computer-executable instructions for performing methods consistent with certain disclosed embodiments. It is contemplated that one or more of the hardware components listed above may be implemented using software. For example, storage 144 may include a software partition associated with one or more other hardware components of condition monitoring system 140. Condition monitoring system 140 may include additional, fewer, and/or different components than those listed above. It is understood that the components listed above are exemplary only and not intended to be limiting.

CPU 141 may include one or more processors, each configured to execute instructions and process data to perform one or more functions associated with condition monitoring system 140. As illustrated in FIG. 2, CPU 141 may be communicatively coupled to RAM 142, ROM 143, storage 144, database 145, I/O devices 146, and interface 147. CPU 141 may be configured to execute sequences of computer program instructions to perform various processes, which will be described in detail below. The computer program instructions may be loaded into RAM for execution by CPU 141.

RAM 142 and ROM 143 may each include one or more devices for storing information associated with an operation of condition monitoring system 140 and/or CPU 141. For example, ROM 143 may include a memory device configured to access and store information associated with condition monitoring system 140, including information for identifying, initializing, and monitoring the operation of one or more components and subsystems of condition monitoring system 140. RAM 142 may include a memory device for storing data associated with one or more operations of CPU 141. For example, ROM 143 may load instructions into RAM 142 for execution by CPU 141.

Storage 144 may include any type of mass storage device configured to store information that CPU 141 may need to perform processes consistent with the disclosed embodiments. For example, storage 144 may include one or more magnetic and/or optical disk devices, such as hard drives, CD-ROMs, DVD-ROMs, or any other type of mass media device.

Database 145 may include one or more software and/or hardware components that cooperate to store, organize, sort, filter, and/or arrange data used by condition monitoring system 140 and/or CPU 141. For example, database 145 may include historical data such as, historic operation, status, and/or productivity data associated with one or more machines operating in the project environment 100. Performance or operational trends may be recorded and analyzed to adjust one or more aspects of machine operation to enhance the operational efficiency and/or productivity of the machine. It is contemplated that database 145 may store additional and/or different information than that listed above.

I/O devices 146 may include one or more components configured to communicate information with a user associated with condition monitoring system 140. For example, I/O devices may include a console with an integrated keyboard and mouse to allow a user to input parameters associated with condition monitoring system 140. I/O devices 146 may also include a display including a graphical user interface (GUI) for outputting information on a monitor. I/O devices 146 may also include peripheral devices such as, for example, a printer for printing information associated with condition monitoring system 140, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 147 may include one or more components configured to transmit and receive data via a communication network, such as the Internet, a local area network, a workstation peer-to-peer network, a direct link network, a wireless network, or any other suitable communication platform. For example, interface 147 may include one or more modulators, demodulators, multiplexers, demultiplexers, network communication devices, wireless devices, antennas, modems, and any other type of device configured to enable data communication via a communication network.

Condition monitoring system 140 may include one or more software applications for diagnosing problems associated with machine 110 and notifying one or more subscribers 150 (e.g., repair personnel, project managers, dispatchers, etc.). For example, software application associated with condition monitoring system 140 may be configured to analyze an operating temperature associated with an engine system. Condition monitoring system 140 may compare current (e.g., real-time) engine temperature data with a historic engine temperature trend. If the current engine temperature data exceeds the historic trend data by a predetermined acceptable amount, condition monitoring system 140 may trigger a engine temperature alarm and/or generate an event notification for distribution to one or more subscribers 150.

Subscriber 150 may include a computer system that is configured to receive data from condition monitoring system 140 in a manner consistent with the disclosed embodiments. For example, subscriber 150 may include one or more computer terminals operated by respective users. Alternatively and/or additionally, subscriber 150 may include personal data assistant (PDA) systems, wireless communication devices (e.g., pagers, phones, etc.), notebook computers, diagnostic computer systems, data analyzers, or any other such computing devices configured to receive and process information, such as operation data. In one embodiment, subscriber 150 may be associated with one or more sections of a business entity associated with managing a remote project site within project environment 100. For instance, subscriber 150 may be associated with a particular division of a business entity associated with project environment 100, such as a project management division, an operations division, a maintenance and/or repair division, a procurement division, a human resource division, and/or any other business entity that may be associated with project environment 100.

In another embodiment, subscriber 150 may be associated with a business entity that is affiliated with machine 110. For example, subscriber 150 may be associated with a site-manager that controls the operation and productivity of the machine 110. Alternatively and/or additionally, different project entities may be associated with different business entities and/or machines 110. Accordingly, the above descriptions are exemplary and not intended to be limiting. The disclosed embodiments contemplate any correlation (or none at all) between one or more business entities, and/or sections thereof, and the components of project environment 100.

Subscriber 150 may be associated with a business entity affiliated with project environment 100 and may be configured to communicate with condition monitoring system 140. In one embodiment, subscriber 150 may transmit and receive operation data to and from condition monitoring system 140 associated with one or more machines 110 operating within project environment 100. For example, subscriber 150 may be an on-site maintenance and repair division that receives alarm signals associated with one or more machines 110 from condition monitoring system 140. Accordingly, the maintenance and repair division may schedule maintenance for the machine to inspect the machine and resolve any problems that may have caused the alarm.

Subscriber 150 may also include portable communication devices associated with one or more personnel affiliated with project environment 100. For example, subscriber 150 may include a wireless pager or cell phone associated with a project manager, machine operator, dispatcher, repair technician, shift scheduler, or machine owner. As such, subscriber 150 may receive alarms and critical operational messages from condition monitoring system 140 associated with one or more machines operating within project environment 100. Accordingly, the features and systems described herein allow subscribers 150 to remotely monitor health, status, and productivity associated with one or more machines 110.

Figure 3:
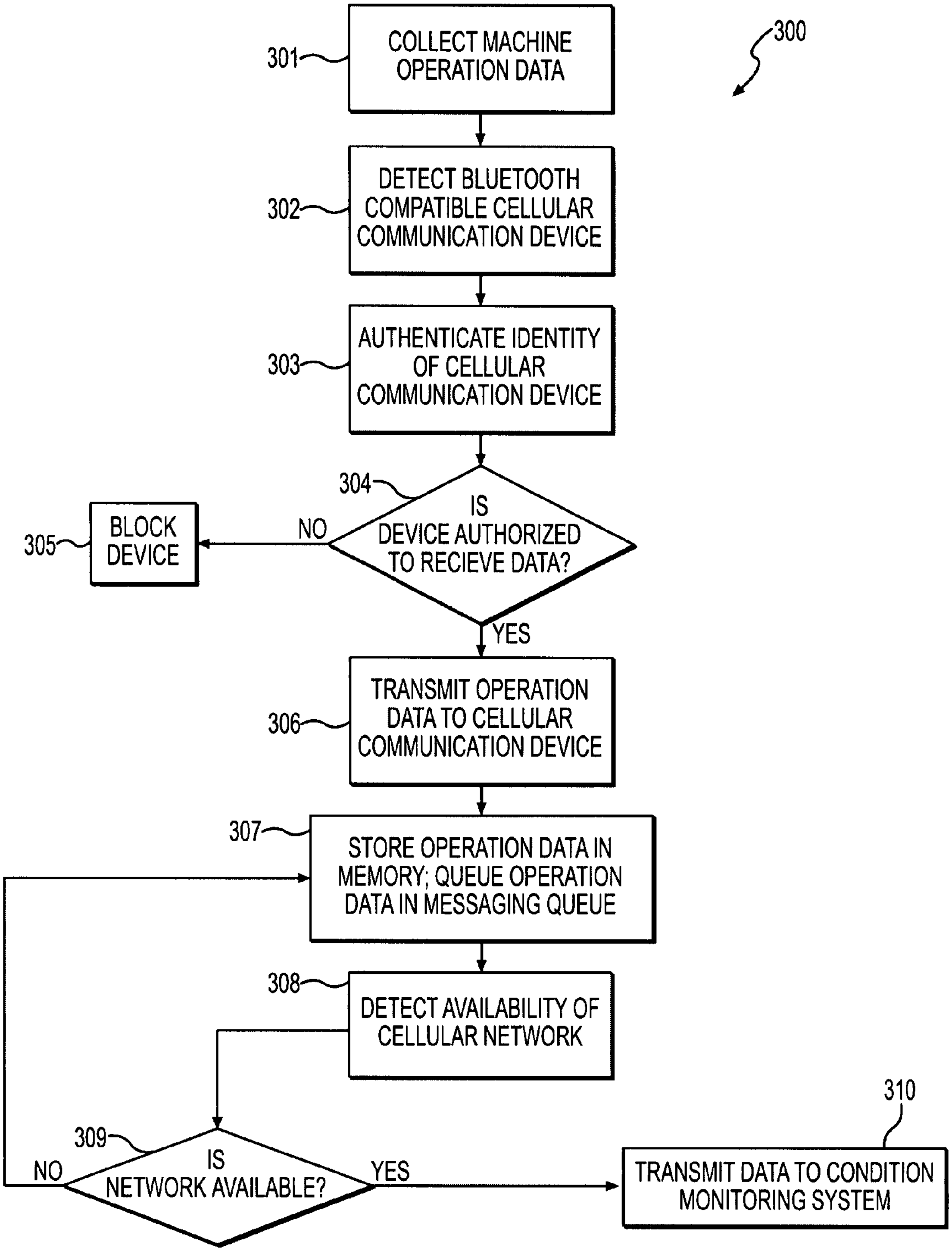
FIG. 3 provides a flowchart depicting an exemplary method for collection and distribution of machine data via a cellular communication device.

Processes and methods consistent with the disclosed embodiments provide a system for transfer of machine data using a cellular network connection associated with a cellular communication device located proximate the machine. More specifically, the system described herein includes an electronic control module of a machine that is configured to transmit machine operation data to an approved cellular communication device, via a PAN communication channel. The cellular communication device may be adapted to transmit the operation data to a condition monitoring system associated with the project environment over a subscriber-based cellular network. The cellular communication device may include a conventional CDMA or GSM cellular telephone that has been formatted, using specialized software, to detect ECMs associated with one or more proximate machines and establish a secure PAN communication channel to download operation data from the ECM. According to one exemplary embodiment, the cellular communication device may include a machine operator's cellular telephone or other PAN-compatible cellular device. FIG. 3 provides a flowchart 300 depicting an exemplary method for collection and distribution of machine data that may be performed by system 120 and/or software associated therewith.

As illustrated in FIG. 3, the method may include receiving/collecting, by electronic control module (ECM) 125 or other data collection device associated with machine 110, operation data monitored by one or more monitoring devices 121 (Step 301). For example, each monitoring device 121 coupled to ECM 125 may be configured to measure a particular operational parameter and stream measured data to ECM 125, for storage and/or analysis. ECM 125 may subsequently collect operational parameters from each of monitoring devices 121 and package the collection of operational parameters to produce one or more electronic operation data files. ECM 125 may store these data files in memory, for distribution and/or uploading to one or more off-board systems.

ECM 125 may detect a PAN-compatible cellular communication device (Step 302). For example, PAN control module 126 associated with ECM 125 may broadcast a search signal to detect other PAN-compatible devices located within a detectable range of ECM 125. In the event that multiple devices are detected, ECM 125 may prioritize the devices based on the strength of the signal received from each device, as devices with the stronger signal strengths typically enable higher-quality data connections, with fewer interruptions and/or data transmission errors.

As explained, PAN control module 126 may embody a PAN communication module integral (i.e., internally located) within ECM 125. Alternatively or additionally, PAN control module 126 may embody a PAN communication dongle 128 that interfaces with an available data port 127, thereby configuring ECM 125 to support PAN communications via data port 127.

Once ECM 125 has detected a PAN-compatible cellular communication device, ECM 125 may authenticate the identity of the device (Step 303). For example, upon configuration of ECM 125 and/or PAN control module 126, users may designate certain pre-approved cellular communication devices as authorized to communicate data with ECM 125. According to one embodiment, ECM 125 and/or PAN control module 126 may include a software interface that allows users to input a unique identification number associated with each cellular phone to be designated as an approved device. This identification number may include, for example, a SIM card ID number, a serial number, a network identification number or name, a MAC address, or any other identifier that may be used to differentiate between different cellular communication devices. ECM 125 may request this identification number from the PAN-compatible cellular communication device and compare this identification number with a list of identification numbers associated with approved cellular communication devices.

If the cellular communication device is not authorized to receive data from ECM 125 (Step 304: No), ECM 125 may block communication with the particular device (Step 305), thereby preventing unauthorized cellular devices from accessing machine operation data. If, on the other hand, the cellular communication device is authorized to receive data (Step 304: Yes), ECM 125 may establish a secure PAN data connection with cellular communication device 129. This secure PAN data connection may be encrypted to prevent unauthorized access to the information, should it be collected by one or more unauthorized devices.

Once a secure PAN data channel has been established, ECM 125 may transmit the operation data to the cellular communication device (Step 306) via the PAN connection between the devices. According to one embodiment, ECM 125 may be configured to format and/or package the data to conform to data transfer requirements associated to the PAN standard. For example, ECM 125 may be configured to parse a large amount of operation data into a plurality of SMS test messages in order to more quickly stream large data files to cellular communication device 129.

Upon receipt of the operation data from ECM 125, cellular communication device 129 may store the operation data in memory (either temporarily or indefinitely) and queue the operation data for transmission in a messaging queue associated with the device (Step 307). Once messages have been placed in the outgoing messaging queue, cellular communication device 129 may detect the availability of the cellular network (Step 308). If the network is unavailable or if the cellular device is out-of-range of the cellular network, cellular communication device 129 may store the data in memory (or in the outgoing message queue) until the cellular network is available (Step 309: No). Once the cellular network is detected and available for data communication (Step 309: Yes), cellular communication device 129 may transmit the data to condition monitoring system 140 (Step 310).

It is contemplated that, although certain processes and method steps are described as being initiated or performed by ECM 125 and/or PAN control module 126, these processes and method steps may be initiated and/or performed by one or more other devices, such as cellular communication device 129. For example, cellular communication device 129 may be configured to detect on or more available ECMs 125, authenticate the identity of each ECMs 125, and establish a PAN communication connection with ECM 125 and/or PAN control module 126.

It is also contemplated that, in certain situations, one cellular communication device 129 may collect and transmit data from ECMs 125 associated with multiple machines operating proximate one another. Accordingly, as an even further cost-reduction measure, a cellular communication device may be strategically situated to increase the PAN coverage area of a cellular communication device so that it can collect operation data from multiple machines operating in relatively close proximity to one another. The "sharing" of data transmission capabilities of a single cellular communication device may be particularly advantageous for reducing costs associated with subscription plans for subscriber-based cellular networks. For example, by allowing a single cellular communication device to handle data transmission functions for multiple machines, only one machine operator operating in a particular location of project environment 100 may be required to subscribe to a cellular service plan that supports text messaging and/or data transmission, thereby reducing costs that may be otherwise be incurred if multiple subscriptions are required.

INDUSTRIAL APPLICABILITY

Systems and methods consistent with the disclosed embodiments provide a solution that facilitates data communication between a machine and a back-end system using existing subscriber-based cellular service associated with cellular communication device proximate the machine. Project environments and work sites that employ the presently disclosed systems and associated methods may realize a reduction in costs associated with data communication for the job site by utilizing existing subscriber-based cellular service. By utilizing existing cellular communication infrastructure and leveraging less expensive cellular telephone technology, costs associated with more expensive satellite communication equipment and service may be reduced and/or eliminated.

Although the disclosed embodiments are described and illustrated as being associated with data collection and distribution systems for heavy machinery, the may be applicable to any environment that relies on the collection of operation data associated with remote assets. Specifically, the presently disclosed systems and methods for collection and distribution of machine data via a cellular communication device may be used in any machine or equipment system where it may be advantageous to monitor machines operating in remote environments using off-the-shelf cellular communication devices and networks, such as an operator's cell phone and service subscription associated therewith. Furthermore, the presently disclosed systems and associated methods may be integrated with a connected worksite environment that monitors, analyzes, and manages operations of a plurality of machines to ensure efficient operation of the worksite.

The presently disclosed systems and methods for collection and distribution of machine data via a cellular device may have several advantages. For example, the presently disclosed system utilizes existing cellular infrastructure and devices that have been adapted to support wireless communication of machine data to a back-end network. As a result, repair or replacement of one or more of these cellular components may be relatively inexpensive when compared with more-expensive satellite communication technology. Furthermore, because cellular networks are terrestrially-based, inclement weather has less effect on the reliability and performance of the network, when compared to orbital satellite-based systems, the performance of which may be vulnerable to inclement weather conditions.

Moreover, because cellular equipment and technology is more widely available than satellite technology, substitute and replacement devices may be more readily available. Thus, if an operator's cellular telephone, a replacement device may be easily configured as a substitute, without requiring specialized parts or specially-trained service personnel to repair the system.

It will be apparent to those skilled in the art that various modifications and variations can be made to the disclosed system for collection and distribution of machine data via a cellular device without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A system for collection and distribution of machine data via a cellular communication device, comprising:

an electronic control module located on a machine, the electronic control module configured to:

collect operation data associated with the machine, wherein the electronic control module includes a serial communication port; and generate one or more text messages containing the operation data;

a personal area network (PAN) control adapter removably coupled to the electronic control module via the serial communication port and configured to:

wirelessly detect a mobile PAN-compatible cellular communication device carried by an operator of the machine and proximate the PAN control module; and transmit the one or more text messages containing the operation data to the mobile PAN-compatible cellular communication device such that the mobile the PAN-compatible cellular communication device carried by the operator of the machine forwards the operation data to a condition monitoring system via a cellular network, wherein the PAN-compatible cellular communication device is configured to forward the operation data by forwarding the one or more text messages containing the operation data to the condition monitoring system over the cellular network using a text messaging service.

2. The system of claim 1, wherein the PAN control module is further configured to:

identify the PAN-compatible cellular communication device;

authenticate the identity of the PAN-compatible cellular communication device; and establish a secure PAN communication channel with the PAN-compatible cellular communication device.

3. The system of claim 1, wherein the PAN control module includes a removable Bluetooth dongle adapted to interface with a serial communication port of the electronic control module.

4. The system of claim 1, wherein the PAN-compatible cellular communication device includes a GSM-compatible cellular communication device.

5. The system of claim 1, wherein the PAN-compatible cellular communication device includes a COMA-compatible cellular communication device.

6. The system of claim 1, wherein the PAN-compatible cellular communication device is configured to:

store the operation data in memory associated with the PAN-compatible cellular communication device;

detect availability of the cellular network; and transmit the operation data to the condition monitoring system when the cellular network is available.

7. The system of claim 1, wherein the condition monitoring system is further configured to:

receive operation data associated with the machine; and output the received operation data on a display.

8. The system of claim 1, wherein to forward the one or more text messages containing the operation data, the PAN-compatible cellular communication device is configured to:

receive the one or more text messages containing the operation data;

store the received one or more text messages containing the operation data in a messaging queue associated with the electronic control module;

determine whether the cellular network is available; and when it is determined that the cellular network is available, transmit the queued one or more text messages to the condition monitoring system over the cellular network using the text messaging service.

9. A method for collection and distribution of machine data via a cellular communication device, comprising:

collecting, by an electronic control module of a machine, operation data associated with the machine;

detecting, by a personal area network (PAN) control module communicatively coupled to the electronic control module, a mobile PAN-compatible cellular communication device carried by an operator of the machine and proximate the PAN control module;

generating, by the electronic control module, one or more text messages containing the operation data; and transmitting, by the PAN control module, the one or more text messages containing the operation data to the mobile PAN-compatible cellular communication device, such that the mobile PAN-compatible cellular communication device carried by the operator of the machine forwards the operation data to a condition monitoring system via a cellular network using a text messaging service of the cellular network.

10. The method of claim 9, further wherein detecting the PAN-compatible cellular communication device includes:

identifying the PAN-compatible cellular communication device;

authenticating the identity of the PAN-compatible cellular communication device; and establishing a secure PAN communication channel with the PAN-compatible cellular communication device.

11. The method of claim 9, wherein the PAN control module includes a removable Bluetooth dongle adapted to interface with a serial communication port of the electronic control module.

12. The method of claim 9, further including:

storing the operation data in memory associated with the PAN-compatible cellular communication device;

detecting, by the PAN-compatible cellular communication device, availability of the cellular network; and transmitting the operation data to the condition monitoring system when the cellular network is available.

13. The method of claim 9, wherein the PAN-compatible cellular communication device includes a GSM-compatible cellular communication device.

14. The method of claim 9, wherein the PAN-compatible cellular communication device includes a COMA-compatible cellular communication device.

15. A project environment, comprising:

at least one monitoring device configured to monitor at least one operational aspect associated with a machine operating in the project environment;

an electronic control module communicatively coupled to the at least one monitoring device, the electronic control module configured to collect data indicative of the at least one operational aspect from the at least one monitoring device, wherein the electronic control module includes a serial communication port;

a Bluetooth control adapter removably coupled to the electronic control module via the serial communication port and configured to:

wirelessly detect a mobile Bluetooth-compatible cellular communication device carried by an operator of the machine and proximate the Bluetooth control module; and generate, by the electronic control module, one or more text messages containing the operation data; and transmit the one or more text messages containing the data indicative of the at least one operational aspect to the mobile Bluetooth-compatible cellular communication device such that the mobile Bluetooth-compatible cellular communication device carried by the operator of the machine forwards the data indicative of the at least one operational aspect to a condition monitoring system via a cellular network using a text messaging service of the cellular network.

16. The method of claim 15, wherein forwarding includes:

receiving, at the PAN-compatible cellular communication device, the one or more text messages containing the operation data;

storing, by the PAN-compatible cellular communication device, the received one or more text messages containing the operation data in a messaging queue associated with the electronic control module;

determining, by the PAN-compatible cellular communication device, whether the cellular network is available; and when it is determined that the cellular network is available, transmitting, by the PAN-compatible cellular communication device, the queued one or more text messages to the condition monitoring system over the cellular network using the text messaging service.

17. The project environment of claim 15, wherein the Bluetooth control module is further configured to:

identify the Bluetooth-compatible cellular communication device;

authenticate the identity of the Bluetooth-compatible cellular communication device; and establish a secure Bluetooth communication channel with the Bluetooth-compatible cellular communication device.

18. The project environment of claim 15, wherein the electronic control module includes a serial communication port and the Bluetooth control a removable Bluetooth dongle adapted to interface with the serial communication port of the electronic control module.

19. The project environment of claim 15, wherein the Bluetooth-compatible cellular communication device is configured to:

store the data indicative of the at least one operational aspect in memory associated with the Bluetooth-compatible cellular communication device;

detect availability of the cellular network; and transmit the data indicative of the at least one operational aspect to the condition monitoring system when the cellular network is available.

20. The project environment of claim 15, wherein to forward the one or more text messages containing the data indicative of the at least one operational aspect, the Bluetooth-compatible cellular communication device is configured to:

receive the one or more text messages containing the data indicative of the at least one operational aspect from the electronic control module;

store the received one or more text messages in a messaging queue associated with the electronic control module;

determine whether the cellular network is available; and when it is determined that the cellular network is available, transmit the queued one or more text messages to the condition monitoring system over the cellular network.

* * * * *

UNITED STATES PATENT AND TRADEMARK OFFICE

CERTIFICATE OF CORRECTION

PATENT NO. : 8,195,231 B2
APPLICATION NO. : 11/981021
DATED : June 5, 2012
INVENTOR(S) : Paul Alan Ring It is certified that error appears in the above-identified patent and that said Letters Patent is hereby corrected as shown below:

In the Specification

Column 1, line 59, delete “etc.) The multimedia” and insert -- etc.). The multimedia --.

Column 3, line 58, delete “etc.) Furthermore,” and insert -- etc.). Furthermore, --.

Column 5, line 1, delete “and or” and insert -- and/or --.

Column 6, lines 60-61, delete “networks, etc.)” and insert -- networks, etc.). --.

Column 9, line 25-26, delete “a engine” and insert -- an engine --.

Column 11, line 67, delete “on or more” and insert -- one or more --.

In the Claims

Column 13, lines 39-40, in Claim 1, delete “the mobile the PAN-compatible” and insert -- the mobile PAN-compatible --.

Column 13, lines 66-67, in Claim 5, delete “a COMA-compatible” and insert -- a CDMA-compatible --.

Column 15, lines 2-3, in Claim 14, delete “a COMA-compatible” and insert -- a CDMA-compatible --.

Column 16, line 16, in Claim 18, delete “a removable Bluetooth” and insert -- module includes a removable Bluetooth --.

Signed and Sealed this
Eighteenth Day of August, 2015

Michelle K. Lee

Michelle K. Lee
*Director of the United States Patent and Trademark Office*